United States Patent [19]

Hamprecht

[11] 4,269,770
[45] May 26, 1981

[54] PROCESS FOR THE PREPARATION OF CYANOAZO DYESTUFFS

[75] Inventor: Rainer Hamprecht, Cologne, Fed. Rep. of Germany

[73] Assignee: Bayer Aktiengesellschaft, Leverkusen, Fed. Rep. of Germany

[21] Appl. No.: 80,842

[22] Filed: Oct. 1, 1979

[30] Foreign Application Priority Data

Oct. 25, 1978 [DE] Fed. Rep. of Germany ....... 2846438

[51] Int. Cl.³ .................... C07C 107/00; C09B 43/00
[52] U.S. Cl. .................................................. 260/208
[58] Field of Search ....................................... 260/208

[56] References Cited

U.S. PATENT DOCUMENTS

| | | | |
|---|---|---|---|
| 3,876,621 | 4/1975 | Hagen et al. | 260/157 |
| 3,978,040 | 8/1976 | Gottschlich et al. | 260/205 |

FOREIGN PATENT DOCUMENTS

| | | |
|---|---|---|
| 854903 | 11/1977 | Belgium . |
| 2352865 | 1/1978 | France . |
| 1125683 | 8/1968 | United Kingdom . |
| 1208405 | 10/1970 | United Kingdom . |
| 1438374 | 6/1976 | United Kingdom . |
| 1529528 | 10/1978 | United Kingdom . |

*Primary Examiner*—A. Lionel Clingman
*Attorney, Agent, or Firm*—Sprung, Felfe, Horn, Lynch & Kramer

[57] ABSTRACT

Ortho-cyanoazo dyestuffs are obtained in good yields and high purity by conversion of appropriate ortho-halogenoazo dyestuffs with complex metal cyanides of the formula $$Me_pCu(CN)_{p+1}$$

wherein
Me = alkali metal
p = 1–3 in pure water, i.e. without adding organic solvents and/or catalysts.

The process is more economic and easier to handle as compared with the known "cyano exchange" methods.

8 Claims, No Drawings

PROCESS FOR THE PREPARATION OF CYANOAZO DYESTUFFS

The invention relates to a process for the preparation of azo compounds, which contain in the diazo component at least one cyano group in the ortho-position relative to the azo bridge, by reacting appropriate ortho-halogenoazo dyestuffs with metal cyanides in an aqueous medium.

This so-called "replacement by cyano" is generally known (compare British Pat. Nos. 1,125,683 and 1,208,405). Carrying out this process in aqueous media has also already been described frequently (compare German Offenlegungsschriften Nos. 2,134,896, 2,310,745, 2,724,116, 2,724,117 and 2,610,675).

However, these methods have the disadvantage that the reaction must be carried out either under pressure or in the presence of water-insoluble solvents and/or special catalysts. Moreover, the yields or the purity of the reaction product leave something to be desired in some cases, especially in the pressure method according to German Offenlegungsschrift No. 2,134,896.

It has now been found that cyanoazo dyestuffs can be prepared in outstanding yields in a simple manner, that is to say dispensing with the relatively expensive water-insoluble solvents and catalysts, if the aqueous "replacement by cyano" is carried out with the aid of alkali metal cyanide complexes of monovalent copper (Cu I).

In a preferred variant of the new process, application of pressure can also be dispensed with.

A particularly preferred embodiment of the process according to the invention is characterised in that the complex compounds are not prepared in a separate operation, but are produced in the reaction vessel in the presence of the o-halogenoazo dyestuffs by mixing alkali metal cyanides with suitable copper-I compounds.

The copper-cyano complexes to be used according to the invention correspond to the general formula

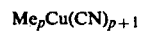
$$Me_pCu(CN)_{p+1}$$

wherein

Me denotes an alkali metal atom (for example Li, K or Na) and p denotes a number from 1 to 3.

p preferably assumes the value 1.

These complexes are known (compare German Offenlegungsschrift No. 2,341,109).

In the case of "in situ preparation" of these complexes, 1 mol of CuCN is mixed with 1, 2 or 3 mols of an alkali metal cyanide in the presence of an aqueous suspension of the o-halogenoazo dyestuffs, but a slight excess or a slightly smaller amount in each case does no harm.

This fact is particularly surprising, since it was known from that German Offenlegungsschrift No. 2,341,109 that reasonable yields are only achieved if a copper-cyano complex which has been formed beforehand is employed and care is taken that the reaction medium is free from (non-complexed) cyanide ions.

Instead of CuCN, it is also possible to use systems which form CuCN (compare British Pat. No. 1,125,683) for preparing the complex. Thus, the copper-cyano complexes are also obtained by mixing 2, 3 or 4 equivalents of an alkali metal cyanide with about 1 equivalent of a copper-I compound, such as, for example, a copper-I halide.

The new process is particularly suitable for the preparation of azo dyestuffs of the formula

$$\underset{A-N=N-K}{\overset{(CN)_n}{|}} \quad (I)$$

from corresponding halogenoazo dyestuffs of the formula

$$\underset{A-N=N-K}{\overset{X_n}{|}} \quad (II)$$

wherein

A denotes an aromatic-carbocyclic radical, preferably of the benzene or naphthalene series, a benzisothiazole radical or a pyrazole radical, X denotes a halogen substituent, preferably chlorine or bromine, which in radical A is in the o-position relative to the azo group, K denotes the radical of a coupling component and n denotes 1 or 2.

Dyestuffs of the formulae (III)

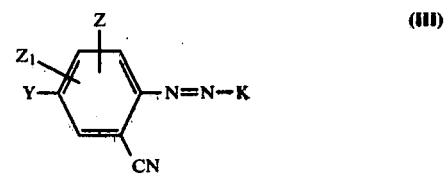

and (IV)

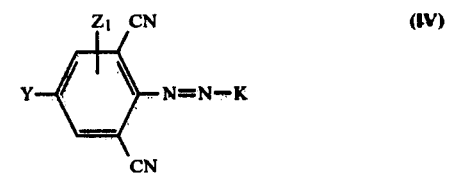

can preferably be prepared by this new process. In these formulae, Y denotes hydrogen or a $-NO_2$, $-CN$, $-R_1$, $-OR_1$, $-CF_3$, $-SO_2R_1$,

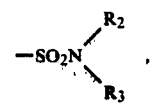
$$-SO_2N\overset{R_2}{\underset{R_3}{\diagdown}},$$

$-F$, $-Cl$, $-Br$, $-COR_4$ or $-N=N-R_5$ group, wherein $R_1$ represents an optionally substituted alkyl, aralkyl or aryl radical, $R_2$ and $R_3$ represent hydrogen or identical or different substituents, which can also together form a constituent of a heterocyclic ring, $R_4$ represents hydrogen, $-OH$ or the $-R_1$, $-OR_1$ or

$$-N\overset{R_2}{\underset{R_3}{\diagdown}}$$

radical and $R_5$ represents aryl,

Z denotes hydrogen or substituents, and amongst these preferably the —NO$_2$, —CN, —R$_1$, —OR$_1$, —CF$_3$, —SO$_2$R$_1$,

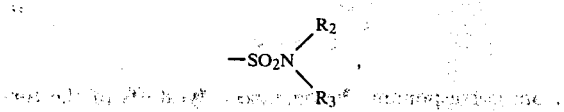

—Cl, —Br, —COR$_4$ groups and heterocyclic radicals of the formulae (V), (VI) and (VII)

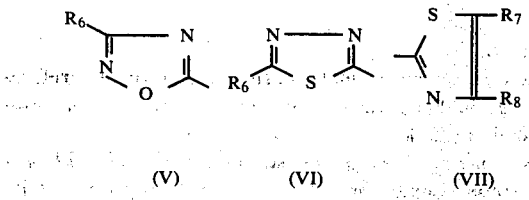

wherein
R$_6$ represents hydrogen or R$_1$,
R$_7$ represents methyl or, together with R$_8$, a fused-on benzene ring and
R$_8$ represents —CO$_2$CH$_3$ or —CO$_2$C$_2$H$_5$,
Z$_1$ denotes hydrogen or substituents, and amongst these preferably the —NO$_2$, —CN, —R$_1$, —OR$_1$, —CF$_3$, —SO$_2$R$_1$,

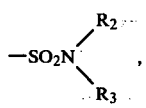

—Cl, —Br and —COR$_4$ groups,
and wherein
Z and Z$_1$ together can also form a fused-on isothiazole ring, and
K has the meaning already indicated.

Suitable radicals K are radicals of coupling components of the benzene, naphthalene, indole, pyridine, thiazole, thiophene, pyrazole and tetrahydroquinoline series, but preferably N-substituted p-aminoarylene radicals, and in particular anilines of the formula VIII

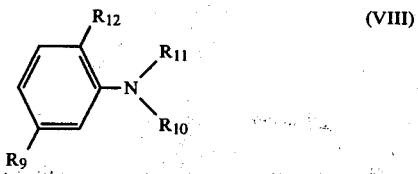

In this formula,
R$^9$ denotes hydrogen, alkyl, alkoxy, aryloxy, alkylcarbonylamino, aralkylcarbonylamino, cycloalkylcarbonylamino, arylcarbonylamino, heterylcarbonylamino, alkoxycarbonylamino, alkylsulphonylamino, arylsulphonylamino, aminocarbonylamino, CN, CF$_3$, carbamoyl, dialkylaminocarbonyl, alkoxycarbonyl, sulphamoyl, dialkylaminosulphonyl, alkylsulphonyl or hydroxl, R$_1$ having the meaning indicated above,
R$_{10}$ denotes hydrogen, alkyl, aralkyl or aryl,
R$_{11}$ denotes hydrogen, alkyl or aralkyl and
R$_{12}$ denotes hydrogen, alkyl, alkoxy, aryloxy, aralkoxy, halogen, CN, carboxyl or alkoxycarbonyl.

By the alkyl and alkoxy radicals mentioned above in any connection (that is to say, for example, also alkylsulphonyl or alkoxycarbonyl) there are to be understood preferably those radicals with 1–4 C. atoms, which are preferably monosubstituted by OH, CN, halogen, C$_1$–C$_4$-alkoxy or C$_2$–C$_5$-alkylcarbonyloxy or by ammonium groups of the formula

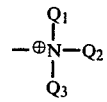

wherein Q$_1$, Q$_2$ and Q$_3$ denote alkyl, cycloalkyl, aralkyl or aryl, or form the remaining members of a N-heterocyclic ring, such as pyridine, imidazole and triazole, whilst by the aryl or aryloxy radicals there are to be understood preferably phenyl or phenoxy radicals, which are optionally monosubstituted by Cl, Br, NO$_2$, CN, C$_1$–C$_4$-alkoxy or C$_1$–C$_4$-alkyl.

Dyestuffs of the formula IX

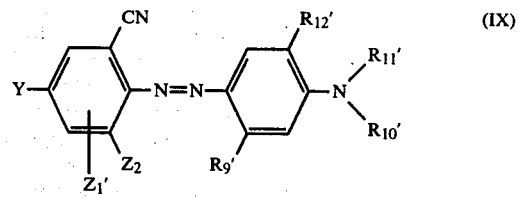

wherein
Z$_2$ denotes nitro, cyano, trifluoromethyl, halogen, methylsulphonyl, ethylsulphonyl or propylsulphonyl,
Z$_1'$ denotes hydrogen or substituents, and amongst these preferably the —NO$_2$, —CN, alkyl, alkoxy, —CF$_3$, —SO$_2$alkyl, —Cl and —Br groups,
and wherein
Z$_1'$ and Z$_2'$ can also together form a fused-on isothiazole ring,
Y denotes hydrogen or a —NO$_2$, —CN, alkyl, alkoxy, —CF$_3$, —SO$_2$R$_1$,

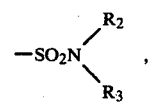

—F, —Cl, —Br, —I or —COR$_4$ group,
wherein
R$_1$–R$_4$ have the abovementioned meaning,
R$_9'$ denotes hydroxyl or —NHBR$_{13}$,
R$_{10}'$ denotes hydrogen, alkyl, aralkyl or aryl,
R$_{11}'$ denotes hydrogen, alkyl or aralkyl,
R$_{12}'$ denotes hydrogen, alkyl, alkoxy, aryloxy, aralkoxy, —CL or —Br,
B denotes —CO—, —CO$_2$— or —SO$_2$—,
R$_{13}$ denotes alkyl, aralkyl, aryl or NV$_1$V$_2$,
V$_1$ denotes hydrogen, alkyl, aralkyl or aryl and
V$_2$ denotes hydrogen, alkyl, aralkyl,
and wherein the proviso that B=—CO— or —SO$_2$— if R$_{13}$=NV$_1$V$_2$ is to apply, can very particularly preferably be prepared by the new process.

The new process is most preferred for the preparation of dyestuffs of the formula (IX) in which R$_9'$=NHSO$_2$alkyl.

By the alkyl and alkoxy radicals in this context there are also understood those radicals with 1-4 C atoms, which are preferably monosubstituted by OH, CN, halogen, $C_1$-$C_4$-alkoxy or $C_2$-$C_5$-alkylcarbonyloxy, whilst by the aryl or aryloxy radicals there are understood preferably phenyl or phenoxy radicals, which are optionally monosubstituted by Cl, Br, $NO_2$, CN, $C_1$-$C_4$-alkoxy or $C_1$-$C_4$-alkyl.

Examples of possible copper-I compounds are $Cu_2O$, CuCl and CuI, but preferably CuBr. In addition, it is also possible to produce the copper-I salts in the reaction medium from copper-II compounds.

Mixtures of alkali metal cyanides and copper-I cyanide or other copper-I compounds which lead to dicyanocuprate (I), that is to say $Cu(CN)_2^{\ominus}$, are preferred.

1:1 (molar) mixtures of alkali metal cyanide and copper-I cyanide are particularly preferred.

Sodium cyanide is the preferred alkali metal cyanide.

The reaction of the o-halogenoazo dyestuffs with the cyanide/copper-I mixtures mentioned is preferably carried out in stoichiometric proportions, that is to say ½ mol of an alkali metal cyanide/copper-I cyanide mixture (1:1) or ⅓ mol of an alkali metal cyanide/copper-I halide (3:1) mixture, and the like, is employed per mol of halogen to be replaced. In addition, in some cases it can be useful to employ a small excess of cyanide (from these mixtures) of up to 20%.

The reaction is generally carried out at 20°-150° C., but preferably at 50°-100° C.

In individual cases it can be favourable to add customary ionic or non-ionic dispersing agents in order to achieve a good fine distribution of the o-halogenoazo dyestuffs, or to add organic water-miscible solvents in order to achieve better solubility.

The o-halogenoazo dyestuffs of the formula II mentioned, which are used as the starting material, can be employed in the dried form, and if appropriate also in the ground form, but the moist press cake is preferably used.

In addition, it is also possible to employ the suspension of the o-halogenoazo dyestuffs such as is obtained directly after the coupling reaction, without intermediate isolation and if necessary after correcting the pH.

The advantages of the new process are, compared with the process of German Offenlegungsschrift No. 2,341,109, that the reaction can now be carried out in water, that the cyanide complexes do not have to be formed beforehand and that moist starting material can be employed, and compared with the process of German Offenlegungsschrift No. 2,134,896, that the reaction can be carried out under normal pressure without using autoclaves and that the reaction proceeds to completion, and compared with the process of German Offenlegungsschrift No. 2,310,745, that the reaction can be carried out without nitrogen bases and with a smaller amount of copper cyanide.

EXAMPLE 1

Preparation of the dyestuff of the formula

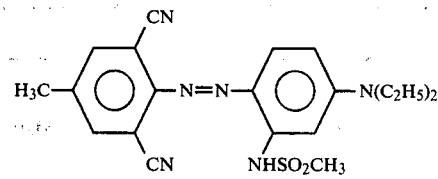

136.6 g of a moist press cake of 3-methanesulphonamido-4-(2',6'-dibromo-4'-methyl-phenylazo)-N,N-diethylaniline with a dyestuff content of 25.9 g and a water content of 110.7 g are stirred in 90 ml of water. The pH is adjusted to 7 with a few drops of sodium hydroxide solution. 2.45 g of sodium cyanide and 4.48 g of copper-I cyanide are added and the mixture is warmed to 95° C. in the course of one hour, whilst stirring, and kept at this temperature for 30 minutes. After cooling to 50° C., 27.3 ml of 38 percent strength hydrochloric acid and 12.8 g of anhydrous iron-III chloride are added and the mixture is stirred for 16 hours. The dyestuff is filtered off and washed with water until the runnings are neutral.

Yield: 18.67 g.

EXAMPLE 2

Preparation of the dyestuff of the formula

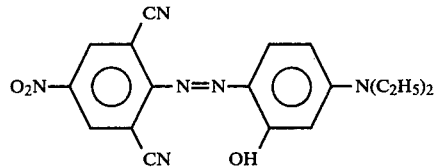

81.24 g of a moist press cake containing 17.1 g of 3-hydroxy-4-(2',6'-dibromo-4'-nitro-phenylazo)-N,N-diethylaniline, 3.57 g of copper-I cyanide and 1.95 g of sodium cyanide are introduced into 135 ml of water. The mixture is warmed to the boiling point under a reflux condenser, whilst stirring, and is kept at this temperature for about 7 hours. After cooling to room temperature, 50 ml of concentrated hydrochloric acid and 7.05 g of anhydrous iron-III chloride are added and the mixture is stirred for 15 hours. The dyestuff is filtered off, washed with 200 ml of water and dried. Yield: 11.2 g of a black powder, which contains at most 5% of the monobromo-monocyano dyestuff and is identical to the product obtained in the "conventional" way by replacement by cyanide using copper cyanide/zinc cyanide.

The dyestuffs listed in the table below can be prepared in good yields in an analogous or similar procedure.

| Example No. | |
| --- | --- |
| 3 | 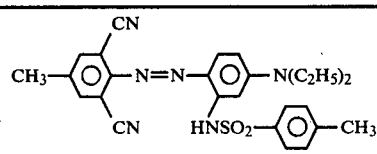 |
| 4 | 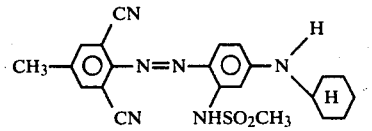 |

| Example No. | |
|---|---|
| 5 | CH₃—⟨○⟩(CN)(CN)—N=N—⟨○⟩(NHSO₂CH₃)—N(C₂H₄OC₂H₅)₂ |
| 6 | Br—⟨○⟩(CN)(CN)—N=N—⟨○⟩(NHSO₂CH₃)—N(CH₂—⟨○⟩)(CH₂CH₂—OC₂H₅) |
| 7 | Br—⟨○⟩(CN)(CN)—N=N—⟨○⟩(OH)—NH—⟨○⟩(Cl) |
| 8 | Br—⟨○⟩(CH₃)(CN)(CN)—N=N—⟨○⟩(OH)—NH—⟨○⟩ |
| 9 | Br—⟨○⟩(CN)(CN)—N=N—⟨○⟩(OH)—N(CH₂CH₂CN)(H) |
| 10 | Br—⟨○⟩(CN)(CN)—N=N—⟨○⟩(OH)—N(C₂H₄CN)(C₂H₅) |
| 11 | O₂N—⟨○⟩(NO₂)(CN)—N=N—⟨○⟩(OH)—N(CH₂—⟨○⟩)(CH₂CH₂CN) |
| 12 | O₂N—⟨○⟩(NO₂)(CN)—N=N—⟨○⟩(OH)—NH—⟨○⟩ |
| 13 | O₂N—⟨○⟩(CF₃)(CN)—N=N—⟨○⟩(OH)—N(C₂H₅)₂ |
| 14 | O₂N—⟨○⟩(SO₂CH₃)(CN)—N=N—⟨○⟩(OH)—N(CH₂—C₆H₅)₂ |
| 15 | O₂N—⟨○⟩(NO₂)(CN)—N=N—⟨○⟩(NHCOCH₃)—N(C₂H₅)(C₂H₅) |
| 16 | O₂N—⟨○⟩(NO₂)(CN)—N=N—⟨○⟩(NHCONH₂)—N(C₂H₅)(C₂H₅) |

I claim:

1. Process for the preparation of azo compounds, which carry in the diazo component at least one cyano group in the ortho-position relative to the azo bridge, by reacting corresponding ortho-halogenoazo dyestuffs with metal cyanides in an aqueous medium, characterised in that the reaction is carried out with copper-cyano complexes without the addition of water-immiscible solvents and/or catalysts.

2. Process according to claim 1, characterised in that it is carried out under normal pressure at 50° to 100° C.

3. Process according to claim 1, characterised in that copper-cyano complexes which are employed are those of the formula $$Me_pCu(CN)_{p+1}$$

wherein

Me denotes an alkali metal atom (Li, Na or K) and p denotes a number from 1 to 3.

4. Process according to claim 1, characterised in that the copper-cyano complexes are prepared in situ in the presence of the o-halogenoazo dyestuffs by mixing 1 mol of copper-I cyanide with 1, 2 or 3 mols of an alkali metal cyanide, or mixing 1 mol of a copper-I halide with 2, 3 or 4 mols of an alkali metal cyanide.

5. Process according to claims 1 or 3, characterised in that copper-cyano complexes which are employed are those of the formula $$MeCu(CN)_2$$

wherein Me denotes an alkali metal atom.

6. Process according to claim 1, characterised in that cyanoazo dyestuffs of the formula

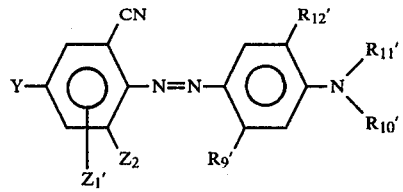

wherein

Y denotes hydrogen or a —NO₂, —CN, alkyl, alkoxy, —CF₃, —SO₂R₁,

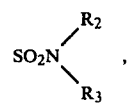

—F, —Cl, —Br, —I or —COR₄ group, $Z_1'$ denotes hydrogen or substituents, and amongst these preferably the —NO₂, —CN, alkyl, alkoxy, —CF₃, —SO₂alkyl, —Cl or —Br groups, and wherein $Z_1'$ and $Z_2$ can also together form a fused-on isothiazole ring, $Z_2$ denotes nitro, cyano, trifluoromethyl, halogen, methylsulphonyl, ethylsulphonyl or propylsulphonyl, $R_1$ denotes alkyl, phenylalkyl or phenyl, $R_2$ and $R_3$ denote hydrogen or identical or different substituents, which can also together be a constituent of a heterocyclic ring, $R_4$ denotes hydrogen, —OH or the —R₁, —OR₁ or

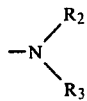

radical,

R$_9'$ denotes —NHBR$_{13}$ or —OH,

R$_{10}'$ denotes hydrogen, alkyl, aralkyl or aryl,

R$_{11}'$ denotes hydrogen, alkyl or aralkyl,

R$_{12}'$ denotes hydrogen, alkyl, alkoxy, —Cl or —Br,

R$_{13}$ denotes alkyl, aralkyl, aryl or NV$_1$V$_2$,

V$_1$ denotes hydrogen, alkyl, aralkyl or aryl,

V$_2$ denotes hydrogen, alkyl or aralkyl and

B denotes —CO—, —CO$_2$— or —SO$_2$—, and wherein the proviso that B=—CO— or —SO$_2$— if R$_{13}$=NV$_1$V$_2$ is to apply, are prepared.

7. Process according to claim 1, characterised in that cyanoazo dyestuffs of the formula indicated in claim 6 wherein R$_9'$ denotes —NHSO$_2$R$_{13}$ and R$_{13}$ has the meaning already given, are prepared.

8. Process according to claim 1, characterised in that cyanoazo dyestuffs of the formula indicated in claim 6 wherein R$_9'$ denotes hydroxyl, are prepared.

* * * * *